(12) United States Patent
Iwai (10) Patent No.: US 10,409,190 B2
(45) Date of Patent: Sep. 10, 2019

(54) OPTICAL SCANNING DEVICE AND IMAGE FORMING APPARATUS

(71) Applicant: CANON KABUSHIKI KAISHA, Tokyo (JP)

(72) Inventor: Hitoshi Iwai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/027,417

(22) PCT Filed: Sep. 26, 2014

(86) PCT No.: PCT/JP2014/075589
§ 371 (c)(1),
(2) Date: Apr. 5, 2016

(87) PCT Pub. No.: WO2015/053095
PCT Pub. Date: Apr. 16, 2015

(65) Prior Publication Data
US 2016/0246207 A1   Aug. 25, 2016

(30) Foreign Application Priority Data

Oct. 9, 2013 (JP) .................................. 2013-212157

(51) Int. Cl.
*G03G 15/043* (2006.01)
*H04N 1/06* (2006.01)
(Continued)

(52) U.S. Cl.
CPC ........... *G03G 15/043* (2013.01); *G02B 26/12* (2013.01); *H04N 1/06* (2013.01); *H04N 1/113* (2013.01); *H04N 2201/0082* (2013.01)

(58) Field of Classification Search
CPC ..................................................... G03G 21/16
See application file for complete search history.

(56) References Cited

U.S. PATENT DOCUMENTS

2009/0226213 A1\* 9/2009 Mogi ...................... B41J 2/473
  399/132
2016/0219177 A1\* 7/2016 Otoguro .................. G02B 7/00

FOREIGN PATENT DOCUMENTS

CN   1441277 A   9/2003
CN   1480793 A   3/2004
(Continued)

*Primary Examiner* — Victor Verbitsky
(74) *Attorney, Agent, or Firm* — Canon U.S.A., Inc. I.P. Division (57) ABSTRACT

A seal member is injection-molded with a simple structure that needs no complicated assembling process.

An optical scanning device 21 includes a light source unit 202 from which a light beam is emitted; a rotating polygon mirror 203 that deflects the light beam such that the light beam emitted from the light source unit 202 is scanned over a photosensitive member; an optical component that directs the light beam deflected by the rotating polygon mirror 203 onto the photosensitive member; an optical housing 20 that contains the light source unit 202, the rotating polygon mirror 203, and the optical component; and a cover 30 that covers an opening of the optical housing 20. The cover 30 includes a seal member 31a molded such that the seal member 31a is sandwiched between the cover 30 and a side wall of the optical housing 20, a gate 31a from which hot melt is injected, and a channel through which the hot melt flows to form the seal member 31a such that the seal member 31a is sandwiched between the side wall of the optical housing 20 and the cover 30. The gate 31a is provided outside a light path area for the light beam when viewed in a direction of a rotational axis of the rotating polygon mirror 203.

10 Claims, 7 Drawing Sheets

(51) Int. Cl.
*H04N 1/113* (2006.01)
*G02B 26/12* (2006.01)

(56) References Cited

FOREIGN PATENT DOCUMENTS

| | | |
|---|---|---|
| CN | 101526670 A | 9/2009 |
| JP | 2002-341275 A | 11/2002 |
| JP | 2004-262118 A | 9/2004 |
| JP | 2009-063833 A | 3/2009 |
| JP | 2009-237552 A | 10/2009 |
| JP | 2012-008250 A | 1/2012 |

* cited by examiner

OPTICAL SCANNING DEVICE AND IMAGE FORMING APPARATUS

TECHNICAL FIELD

The present invention relates to an optical scanning device with which an electrophotographic image forming apparatus, such as a copying machine, a printer, or a facsimile, is equipped and to the image forming apparatus equipped with the optical scanning device.

BACKGROUND ART

Electrophotographic image forming apparatuses, such as laser beam printers and digital copying machines, are provided with an optical scanning device that exposes a photosensitive member to light. The optical scanning device deflects a light beam emitted from a semiconductor laser by using a rotating polygon mirror that rotates and scans the light beam over the photosensitive member. An electrostatic latent image is thereby produced on the photosensitive member. Toner is attached to the electrostatic latent image for developing, so that a toner image is formed. The toner image is transferred to a sheet to form an image.

In recent years, the colorization of image forming apparatuses has been developed. For color image forming apparatuses, the so-called tandem-type, which includes photosensitive members that are each used for one color and collectively forms images in the respective colors on an intermediate transfer member, has been the mainstream type. In tandem-type color image forming apparatuses, the so-called four-in-one optical scanning devices, in which one rotating polygon mirror performs exposure for four colors, are widely used because of an advantageous unit size and cost.

Recent trends in image forming apparatuses that can be mentioned herein are an increase in speed and an increase in resolution, in addition to the colorization described above.

One measure to achieve the increase in speed and the increase in resolution is to rotate the rotating polygon mirror at a high speed. However, the rotation of the rotating polygon mirror at a high speed creates a high negative pressure near the rotating polygon mirror in the interior of the optical scanning device, so that it is easy for the optical scanning device to draw air from the exterior. The air drawn from the exterior of the optical scanning device may include fine dust and volatile matter in grease used in the image forming apparatus itself. When such air enters the optical scanning device, extraneous matter on the reflective surfaces of the rotating polygon mirror increases, and, within a period from several weeks to several months, an image failure may occur, for example, such that density is extremely decreased at part of the image due to a decrease in the amount of exposure light.

To prevent this, an elastic seal member made of synthetic rubber or polyurethane is attached to a cover for an optical housing at a junction that comes in contact with the outer periphery of the optical housing. The seal member is sandwiched between the cover and the optical housing to ensure the sealability of the interior of the optical housing. The seal member, as an independent component, is attached to the cover or the optical housing with a double-sided tape. For reliable sealing, however, it is necessary to carefully attach the seal member such that the seal member follows the shape of the cover or the optical housing. This operation is complicated.

In view of this, for example, PTL 1 discloses that an optical scanning device is configured such that a separated seal member is not attached, but an elastomeric seal member is injection-molded integrally on the optical housing or the cover so that an assembling process is simplified and the optical scanning device achieves sealability.

CITATION LIST

Patent Literature

PTL 1: Japanese Patent Laid-Open No. 2004-262118

SUMMARY OF INVENTION

Technical Problem

Figure 7:
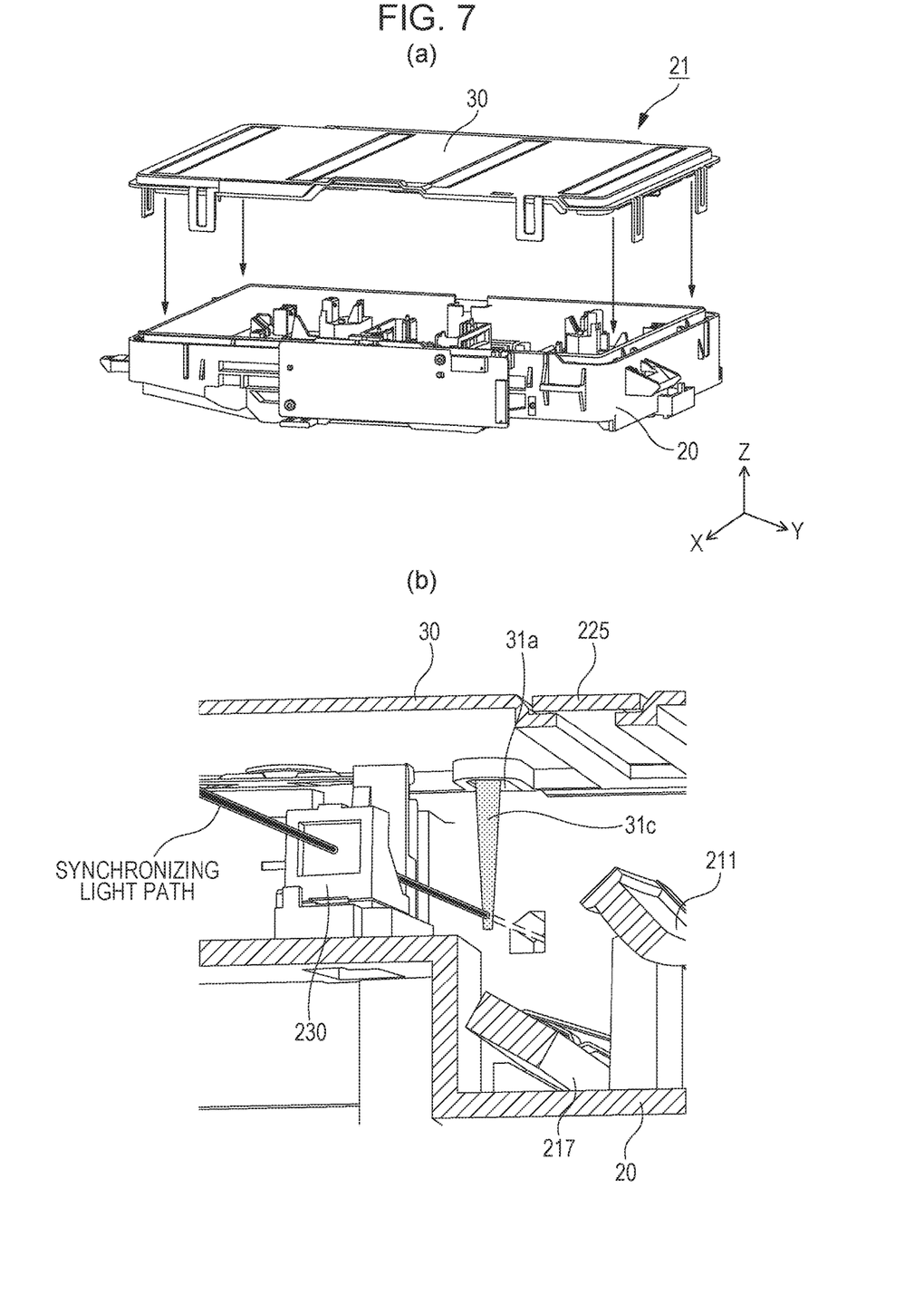
FIG. 7 shows a perspective view of a conventional optical scanning device and an explanatory view of the internal structure of part of the optical scanning device.

FIG. 7(a) is a perspective view showing the appearance of an optical scanning device 21 described later. As shown in FIG. 7(a), the optical scanning device 21 includes an optical housing 20 and a cover 30 that covers the opened side of the optical housing. A rotating polygon mirror, various lenses, reflection mirrors, and so on, which will be described later, are held together in the interior of the optical housing 20. The cover 30 covers the opened side of the optical housing 20 and seals the interior of the optical housing 20. The detail of the optical scanning device 21 will be described later.

A seal member is formed on the cover 30 by injection molding in order to ensure the sealability of the interior of the optical housing 20. The injection molding of the seal member on the cover 30 for the optical housing 20 requires a gate 31a from which molten material to form the seal member is injected. After the seal member has been injection-molded by injecting the molten material from the gate 31a, as shown in FIG. 7(b), there is a residual runner portion 31c that protrudes from the gate 31a and is in the form of the injection nozzle of an injection molding apparatus, as in typical injection-molded parts. Accordingly, there is a concern that, as shown in FIG. 7(b), the runner portion 31c may block a light path for synchronizing light that is to be incident on a synchronizing sensor, depending on a position at which the gate 31a is provided, and the malfunction of the optical scanning device or a failure in images formed on a photosensitive member may occur. There is also a concern that the runner portion 31c may come in contact with the reflection mirror or lens and push away the lens and so on, and the position at which the photosensitive member is irradiated with the light beam may be out of position. Consequently, there is the problem in that prevention of this requires an extra work process such as cutting the runner portion 31c protruding from the gate 31a.

The present invention has been accomplished in such circumstances, and an object of the present invention is to injection-mold the seal member with a simple structure that needs no complicated assembling process.

Solution to Problem

To solve the above problem, the present invention has the following features.

(1) An optical scanning device includes a light source from which a light beam is emitted, a rotating polygon mirror that deflects the light beam such that the light beam emitted from the light source is scanned over a photosensitive member, an optical component that directs the light beam deflected by the rotating polygon mirror onto the photosensitive member, an optical housing that contains the light source, the rotating polygon mirror, and the optical component, and a cover that covers an opening of the optical housing. The cover includes a dustproof member that is sandwiched between the cover and a side wall of the optical housing and molded on the cover so that the dustproof member protects an interior of the optical housing from dust, a gate from which melt of the dustproof member is injected, and a channel through which the melt of the dustproof member injected from the gate flows. The channel is formed in the cover such that the dustproof member is sandwiched between the side wall and the cover by attaching the cover to the optical housing. The gate is provided outside a light path area for the light beam when viewed in a direction of a rotational axis of the rotating polygon mirror.

(2) An optical scanning device includes a light source from which a light beam is emitted, a rotating polygon mirror that deflects the light beam such that the light beam emitted from the light source is scanned over a photosensitive member, an optical component that directs the light beam deflected by the rotating polygon mirror onto the photosensitive member, an optical housing that contains the light source, the rotating polygon mirror, and the optical component, and a cover that covers an opening of the optical housing. The cover includes a dustproof member that is sandwiched between the cover and a side wall of the optical housing and molded on the cover so that the dustproof member protects an interior of the optical housing from dust, a gate from which melt of the dustproof member is injected, and a channel through which the melt of the dustproof member injected from the gate flows. The channel is formed in the cover such that the dustproof member is sandwiched between the side wall and the cover by attaching the cover to the optical housing. The gate is formed at a position at which a virtual normal extending vertically with respect to the cover from the gate does not intersect a light path area for the light beam in the optical housing.

(3) An optical scanning device includes a light source from which a light beam is emitted, a rotating polygon mirror that deflects the light beam such that the light beam emitted from the light source is scanned over a photosensitive member, an optical component that directs the light beam deflected by the rotating polygon mirror onto the photosensitive member, an optical housing that contains the light source, the rotating polygon mirror, and the optical component, and a cover that covers an opening of the optical housing. The optical housing includes a wall extending vertically from a bottom of the optical housing such that the wall surrounds the rotating polygon mirror provided on the bottom of the optical housing. The cover includes a first cover that covers a first opening through which the rotating polygon mirror is caused to pass when the rotating polygon mirror is provided on the bottom and that is surrounded by the wall and a second cover that covers a second opening that is an opening of the optical housing other than the first opening. The first cover includes a dustproof member that is sandwiched between the first cover and the vertically extending wall and molded on the first cover so that the dustproof member protects an interior of the optical housing from dust, a gate from which melt of the dustproof member is injected, and a channel through which the melt of the dustproof member injected from the gate flows. The channel is formed in the first cover such that the dustproof member is sandwiched between the vertically extending wall and the first cover by attaching the first cover to the optical housing. The gate is provided outside a light path area for the light beam when viewed in a direction of a rotational axis of the rotating polygon mirror.

(4) An optical scanning device includes a light source from which a light beam is emitted, a rotating polygon mirror that deflects the light beam such that the light beam emitted from the light source is scanned over a photosensitive member, an optical component that directs the light beam deflected by the rotating polygon mirror onto the photosensitive member, an optical housing that contains the light source, the rotating polygon mirror, and the optical component, and a cover that covers an opening of the optical housing. The optical housing includes a wall extending vertically from a bottom of the optical housing such that the wall surrounds the rotating polygon mirror provided on the bottom of the optical housing. The cover includes a first cover that covers a first opening through which the rotating polygon mirror is caused to pass when the rotating polygon mirror is provided on the bottom and that is surrounded by the wall and a second cover that covers a second opening that is an opening of the optical housing other than the first opening. The first cover includes a dustproof member that is sandwiched between the first cover and the vertically extending wall and molded on the first cover so that the dustproof member protects an interior of the optical housing from dust, a gate from which melt of the dustproof member is injected, and a channel through which the melt of the dustproof member injected from the gate flows. The channel is formed in the first cover such that the dustproof member is sandwiched between the vertically extending wall and the first cover by attaching the first cover to the optical housing. The gate is formed at a position at which a virtual normal extending vertically with respect to the first cover from the gate does not intersect a light path area for the light beam in the optical housing.

(5) An image forming apparatus includes an optical scanning device described in (1) to (4), the photosensitive member on which an electrostatic latent image is formed by a light beam scanned from the optical scanning device, and a developing unit that develops the electrostatic latent image formed on the photosensitive member.

Advantageous Effects of Invention

The present invention enables the seal member to be injection-molded with a simple structure that needs no complicated assembling process.

DESCRIPTION OF EMBODIMENTS

Embodiments of the present invention will hereinafter be described in detail with reference to the drawings.

First Embodiment

An embodiment of the present invention will be described below with reference to the drawings. In the following description, the direction of the rotational axis of a rotating polygon mirror 203, described later, corresponds to a Z-axis direction, a main scanning direction that is the scanning direction of a light beam or the longitudinal direction of a reflection mirror corresponds to an X-axis direction, and the direction perpendicular to the X-axis and the Z-axis corresponds to a Y-axis direction.

[Outline of Image Forming Apparatus]

Figure 1:
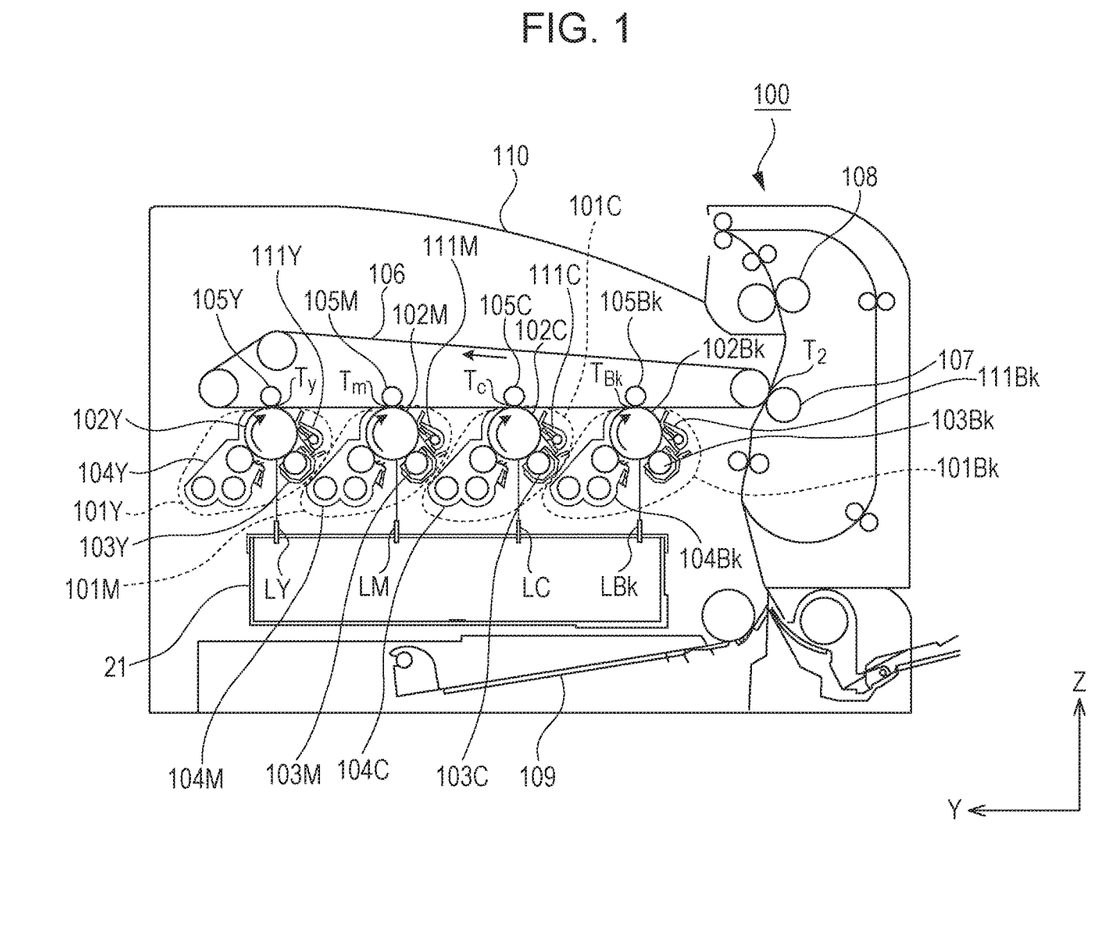
FIG. 1 is a schematic sectional view of an image forming apparatus in a first embodiment.

FIG. 1 is a sectional schematic view of an electrophotographic image forming apparatus 100 in the first embodiment. The image forming apparatus 100 shown in FIG. 1 includes four image forming units 101Y, 101M, 101C, and 101Bk that form respective toner images that are each colored in yellow (Y), magenta (M), cyan (C), and black (Bk) The symbols Y, M, C, and Bk, which represent the colors, are omitted in the following description unless necessary. The image forming units 101 include respective photosensitive drums 102 that are photosensitive members. The image forming units also include respective charging devices 103 that charge the corresponding photosensitive drums 102, and respective developing devices 104 that develop electrostatic latent images on the corresponding photosensitive drums with toner. The image forming units also include respective cleaning devices 111 that remove residual toner on the corresponding photosensitive drums from the photosensitive drums (photosensitive members).

The image forming units are configured as process cartridges in which the respective photosensitive drums 102, charging devices 103, developing devices 104, and cleaning devices 111 are integrated. The process cartridges are replacement units that are attachable to and detachable from the image forming apparatus 100. The image forming units 101Y, 101M, 101C, and 101Bk are referred to as the process cartridges 101Y, 101M, 101C, and 101Bk below.

The main body of the image forming apparatus 100 is provided with the optical scanning device 21, transfer rollers 105Y, 105M, 105C, and 105Bk, an intermediate transfer belt 106, a paper feeding unit 109, a paper discharging unit 110, a transfer roller 107, and a fixing device 108. The intermediate transfer belt 106 rotates in the direction of an arrow shown in the figure (counterclockwise direction). The optical scanning device 21 is disposed below the photosensitive drums 102 in the direction of gravity (−Z-axis direction). The optical scanning device 21 may be disposed so as to expose the photosensitive drums 102 to light from the upper side in direction of gravity (+Z-axis direction).

A process of forming an image will next be described. The optical scanning device 21 emits light beams LY, LM, LC, and LBk to which the photosensitive drums 102Y, 102M, 102C, and 102Bk that are charged by the respective charging devices 103Y, 103M, 103C, and 103Bk are exposed. An electrostatic latent image is formed on each of the photosensitive drums 102Y, 102M, 102C, and 102Bk by the exposure to the light beam.

The developing device 104Y develops the electrostatic latent image formed on the photosensitive drum 102Y with yellow toner. The developing device 104M develops the electrostatic latent image formed on the photosensitive drum 102M with magenta toner. The developing device 104C develops the electrostatic latent image formed on the photosensitive drum 102C with cyan toner. The developing device 104Bk develops the electrostatic latent image formed on the photosensitive drum 102Bk with black toner.

The yellow toner image formed on the photosensitive drum 102Y is transferred to the intermediate transfer belt 106, which is an intermediate transfer member, by the transfer roller 105Y at a transfer unit Ty. The cleaning device 111Y collects the residual toner on the photosensitive drum 102Y that is not transferred to the intermediate transfer belt 106 at a portion in the rotation direction of the photosensitive drum 102Y between the transfer unit Ty and a charge unit of the charging device 103Y. The magenta toner image formed on the photosensitive drum 102M is transferred to the intermediate transfer belt 106 by the transfer roller 105M at a transfer unit Tm. The cleaning device 111M collects the residual toner on the photosensitive drum 102M that is not transferred to the intermediate transfer belt 106 at a portion in the rotation direction of the photosensitive drum 102M between the transfer unit Tm and a charge unit of the charging device 103M.

The cyan toner image formed on the photosensitive drum 102C is transferred to the intermediate transfer belt 106 by the transfer roller 105C at a transfer unit Tc. The cleaning device 111C collects the residual toner on the photosensitive drum 102C that is not transferred to the intermediate transfer belt 106 at a portion in the rotation direction of the photosensitive drum 102C between the transfer unit Tc and a charge unit of the charging device 103C. The black toner image formed on the photosensitive drum 102Bk is transferred to the intermediate transfer belt 106 by the transfer roller 105Bk at a transfer unit TBk. The cleaning device 111Bk collects the residual toner on the photosensitive drum 102Bk that is not transferred to the intermediate transfer belt 106 at a portion in the rotation direction of the photosensitive drum 102Bk between the transfer unit TBk and a charge unit of the charging device 103Bk.

The cleaning devices 111 in the embodiment include a blade that comes into contact with the respective photosensitive drums 102. The residual toner on each of the photosensitive drums is scraped and collected by the blade. At a transfer unit T2, the transfer roller 107 transfers, to recording paper fed from the paper feeding unit 109, the toner images in the respective colors that have been transferred to the intermediate transfer belt 106. The toner images transferred to the recording paper at the transfer unit T2 are subjected to a fixing process with the fixing device 108 and discharged to the paper discharging unit 110 after the fixing process.

With regard to the structures described below, the image forming apparatus 100 described above may be a monochrome image forming apparatus with one photosensitive drum or an image forming apparatus that transfers toner images formed on photosensitive drums directly to recording medium.

[Outline of Optical Scanning Device]

Figure 2:
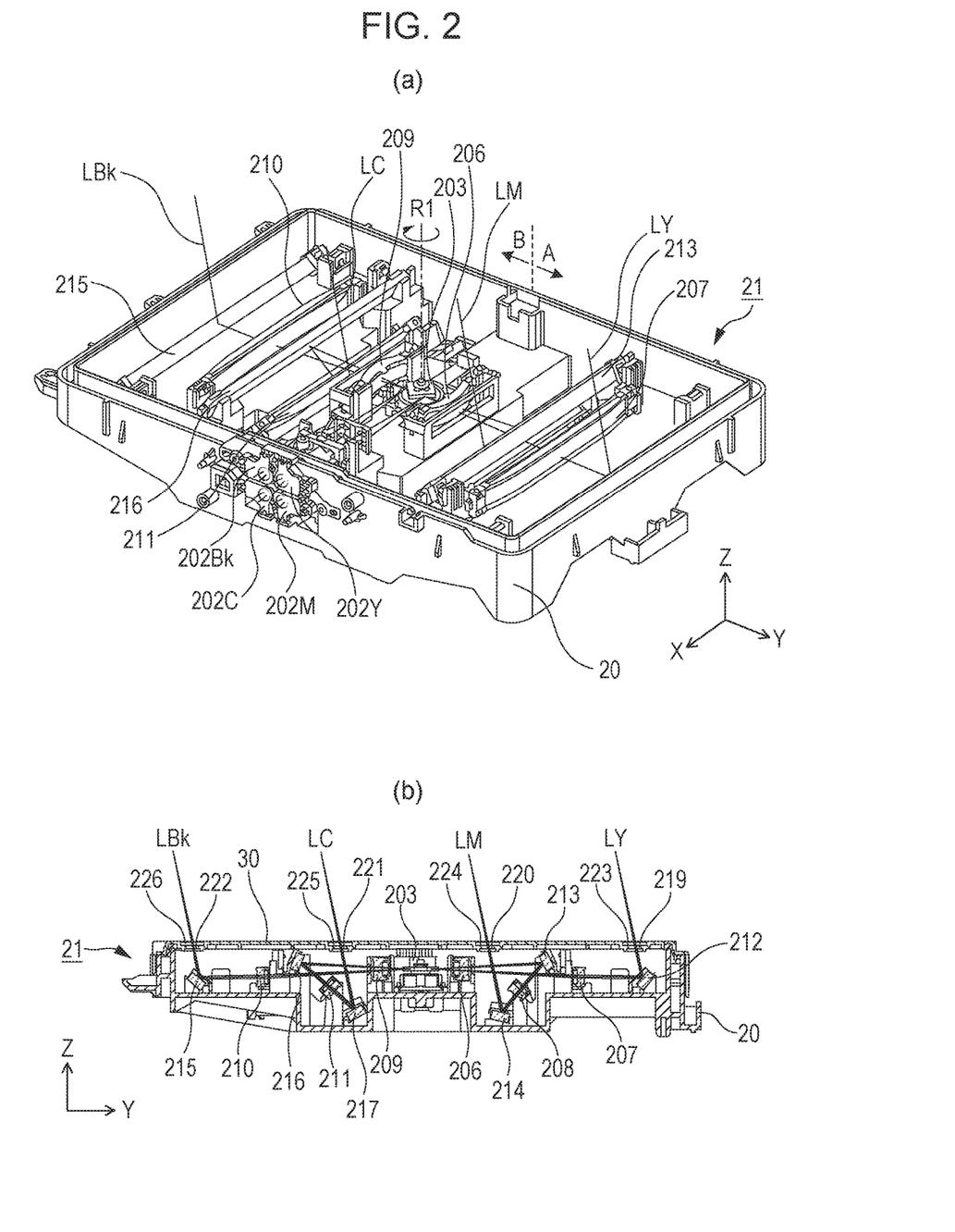
FIG. 2 shows a perspective view of the structure of optical scanning devices in the first embodiment and a second embodiment and a sectional view of the optical scanning devices.

The optical scanning device 21 will next be described. FIG. 2(a) is a perspective view of the structure of the optical scanning device 21. FIG. 2(b) is a sectional view of the optical scanning device 21. As shown in FIG. 2(a), light source units 202Y, 202M, 202C, and 202Bk are attached to the outer wall of the optical housing 20 of the optical scanning device 21. The light source unit 202Y emits a light beam LY to which the photosensitive drum 102Y is exposed. The light source unit 202M emits a light beam LM to which the photosensitive drum 102M is exposed. The light source unit 202C emits a light beam LC to which the photosensitive drum 102C is exposed. The light source unit 202Bk emits a light beam LBk to which the photosensitive drum 102Bk is exposed.

The light source units 202Y, 202M, 202C, and 202Bk are disposed so as to be close to each other. A plane that cuts across the rotating polygon mirror 203 such that the rotation axis of the rotating polygon mirror 203 is a normal is defined here as a virtual plane. The light beam LY emitted from the light source unit 202Y and the light beam LBk emitted from the light source unit 202Bk are incident diagonally on the virtual plane from the upper side in the direction of gravity (+Z-axis direction) and are incident on one of the reflective surfaces of the rotating polygon mirror 203. In contrast, the light beam LC emitted from the light source unit 202C and the light beam LM emitted from the light source unit 202M are incident diagonally on the virtual plane from the lower side in the direction of gravity (−Z-axis direction) and are incident on one of the reflective surfaces of the rotating polygon mirror 203. As shown in FIG. 2(a), the rotating polygon mirror 203 with four reflective surfaces is disposed at a central portion of the optical housing 20. The rotating polygon mirror 203 rotates in the direction R1 about the rotation axis shown by a dotted line in FIG. 2(a) when an image is formed.

The light beam LY emitted from the light source unit 202Y is incident on one of the reflective surfaces of the rotating polygon mirror 203. The light beam LY is deflected (reflected) to the A side shown in FIG. 2(a) by the reflective surface of the rotating polygon mirror 203. The light beam LM emitted from the light source unit 202M is incident on the same reflective surface as the reflective surface of the rotating polygon mirror 203 on which the light beam LY is incident. The light beam LM is deflected to the same side (A side) as the light beam LY by the reflective surface of the rotating polygon mirror 203.

In contrast, the light beam LBk emitted from the light source unit 202Bk is incident on one of the reflective surfaces that differs from the reflective surface on which the light beams LY and LM are incident. The light beam LBk is deflected to the B side shown in FIG. 2(a) by the reflective surface of the rotating polygon mirror 203. The light beam LC emitted from the light source unit 202C is incident on the same reflective surface as the reflective surface of the rotating polygon mirror 203 on which the light beam LBk is incident. The light beam LC is deflected to the same side (B side) as the light beam LBk by the reflective surface of the rotating polygon mirror 203.

The light beams LY and LM deflected by the rotating polygon mirror 203 become light beams that move in the +X direction. In other words, the light beam LY becomes a light beam that is scanned over the photosensitive drum 102Y in the +X direction and the light beam LM becomes a light beam that is scanned over the photosensitive drum 102M in the +X direction, as a result of being deflected by the rotating polygon mirror 203 that rotates.

In contrast, the light beams LBk and LC deflected by the rotating polygon mirror 203 become light beams that move in the −X direction. In other words, the light beam LBk becomes a light beam that is scanned over the photosensitive drum 102Bk in the −X direction and the light beam LC becomes a light beam that is scanned over the photosensitive drum 102C in the −X direction, as a result of being deflected by the rotating polygon mirror 203 that rotates.

Light paths for the light beams LY, LM, LC, and LBk deflected by the rotating polygon mirror 203 will next be described with reference to FIG. 2(b). As shown in FIG. 2(b), optical components such as the rotating polygon mirror 203, lenses 206, 207, 208, 209, 210, and 211, reflection mirrors 212, 213, 214, 215, 216, and 217 are contained in the interior of the optical housing 20 and disposed on the bottom (bottom surface) of the optical housing 20. The cover 30 that protects the rotating polygon mirror 203, the above lenses, and the reflection mirrors from dust is attached at an opening of an upper portion of the optical housing 20 that is an opened side.

The light beam LY deflected by the rotating polygon mirror 203 is incident on the reflection mirror 212 after passing the lens 206 and lens 207. The reflection mirror 212 reflects the incident light beam LY toward the photosensitive drum 102Y. An opening 219 that allows the light beam LY reflected by the reflection mirror 212 to pass is formed in the cover 30. The opening 219 is covered by a dustproof window 223 that is a transparent window that allows the light beam LY to pass. The light beam LY that has passed the dustproof window 223 forms an image on the photosensitive drum 102Y.

The light beam LM deflected by the rotating polygon mirror 203 is incident on the reflection mirror 213 after passing the lens 206. The reflection mirror 213 reflects the incident light beam LM toward the reflection mirror 214. The light beam LM reflected by the reflection mirror 213 is incident on the reflection mirror 214 via the lens 208. The reflection mirror 214 reflects the incident light beam LM toward the photosensitive drum 102M. An opening 220 that allows the light beam LM reflected by the reflection mirror 214 to pass is formed in the cover 30. The opening 220 is covered by a transparent dustproof window 224 that allows the light beam LM to pass. The light beam LM that has passed the dustproof window 224 forms an image on the photosensitive drum 102M.

The light beam LBk deflected by the rotating polygon mirror 203 is incident on the reflection mirror 215 after passing the lens 209 and the lens 210. The reflection mirror 215 reflects the incident light beam LBk toward the photosensitive drum 102Bk. An opening 222 that allows the light beam LBk reflected by the reflection mirror 215 to pass is formed in the cover 30. The opening 222 is covered by a transparent dustproof window 226 that allows the light beam LBk to pass. The light beam LBk that has passed the dustproof window 226 forms an image on the photosensitive drum 102Bk.

The light beam LC deflected by the rotating polygon mirror 203 is incident on the reflection mirror 216 after passing the lens 209. The reflection mirror 216 reflects the incident light beam LC toward the reflection mirror 217. The light beam LC reflected by the reflection mirror 216 is incident on the reflection mirror 217 via the lens 211. The reflection mirror 217 reflects the incident light beam LC toward the photosensitive drum 102C. An opening 221 that allows the light beam LC reflected by the reflection mirror 217 to pass is formed in the cover 30. The opening 221 is covered by a transparent dustproof window 225 that allows the light beam LC to pass. The light beam LC that has passed the dustproof window 225 forms an image on the photosensitive drum 102C.

[Structure of Cover]

Figure 3:
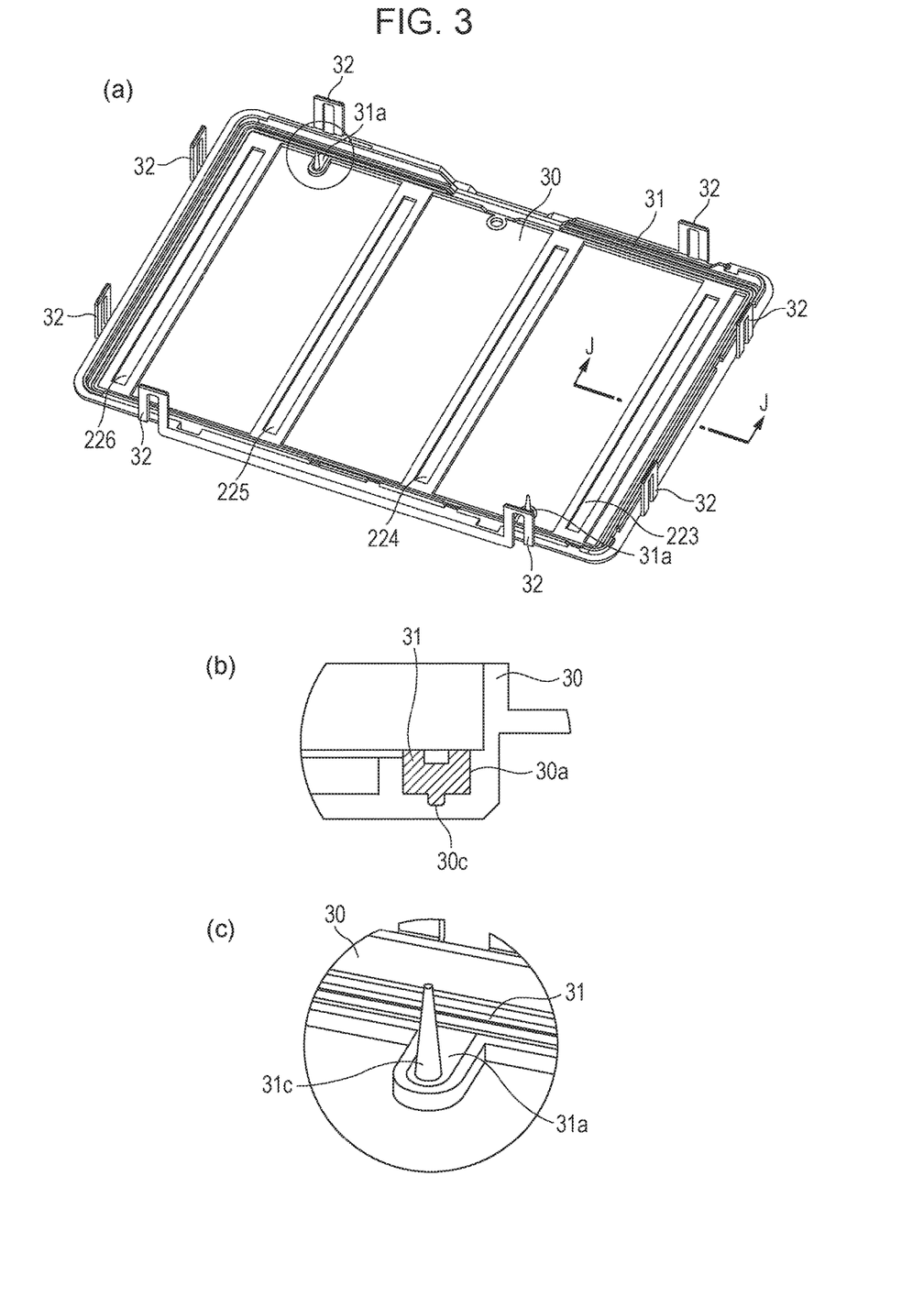
FIG. 3 is an explanatory view of the structure of a cover and a gate in the first embodiment.

FIG. 3(a) shows the structure of the cover 30 in the embodiment and is a perspective view of the cover 30 when viewed from the side of the optical housing 20. In FIG. 3(a), the cover 30 is provided with plural hooks 32 that are engaged with projections provided on the outer wall of the optical housing 20 and provide a snap-fit structure. The cover 30 is also provided with the dustproof windows 223, 224, 225, and 226. When the cover 30 is attached to the optical housing 20, a seal member 31 that is a dustproof member is formed by injection molding along the entire portion of the cover 30 that faces the outer periphery formed by the side wall of the optical housing 20. In FIG. 3(a), the gates 31a from which a hot melt adhesive (referred to as "hot melt" below) of molten polyolefin, which is a molding material, is injected during injection molding are provided at two positions such that the entire length of the seal member 31 is substantially halved. Although the gates 31a are provided at the two positions in the embodiment, the number of the gates 31a can be increased or decreased in accordance with actual moldability, and it is sufficient to provide at least one gate.

The seal member 31 is formed on the cover 30 in a manner in which polyolefin hot melt is injected into a space between the formed cover 30 and a mold in contact with the cover 30. FIG. 3(b) is a J-J sectional view of the cover 30 that is taken along J-J (a dashed line) shown by an outlined arrow in FIG. 3(a) and shows the relation between the cover 30 and the seal member 31. In FIG. 3(b), the cover 30 is provided with a groove 30a through which the hot melt injected from the gates 31a flows. The groove 30a is filled with the hot melt and the seal member 31 is thereby formed. The groove 30a is formed such that the seal member 31 is sandwiched between the side wall of the optical housing 20 and the cover 30 by attaching the cover 30 to the optical housing 20. A narrow, shallow anchor groove 30c is provided in the interior of the groove 30a, so that a contact area between the cover 30 and the seal member 31 is increased. This ensures adhesion between the cover 30 and the seal member 31 in order to prevent the seal member, which is a dustproof member, from being unintentionally detached from the cover 30. A depressed groove is formed on the surface of the seal member 31. The outer periphery formed by the side wall of the optical housing 20 is inserted into this groove, so that the interior of the optical housing 20 is protected from dust and the sealability of the optical housing 20 is ensured.

FIG. 3(c) is an enlarged view of part (a portion around the gate 31a) of the cover 30 that is encircled in FIG. 3(a). When the seal member 31 is formed by injection molding, the hot melt is injected from the gates 31a through injection nozzles. Accordingly, as shown in FIG. 3(c), the molding materials that remain in the injection nozzles are solidified after the injection of the hot melt is finished, and the runner portions 31c are formed into the forms of the nozzles at the gates 31a. When the runner portions 31c are formed at the gates 31a, there is a concern that, as shown in FIG. 7(b), the runner portions 31c may block the light paths for the light beams in the optical housing 20 or the runner portions 31c may come in contact with the optical components disposed in the optical housing 20 so that the posture or the position of the optical components may be changed.

[Disposed Gate Area]

Figure 4:
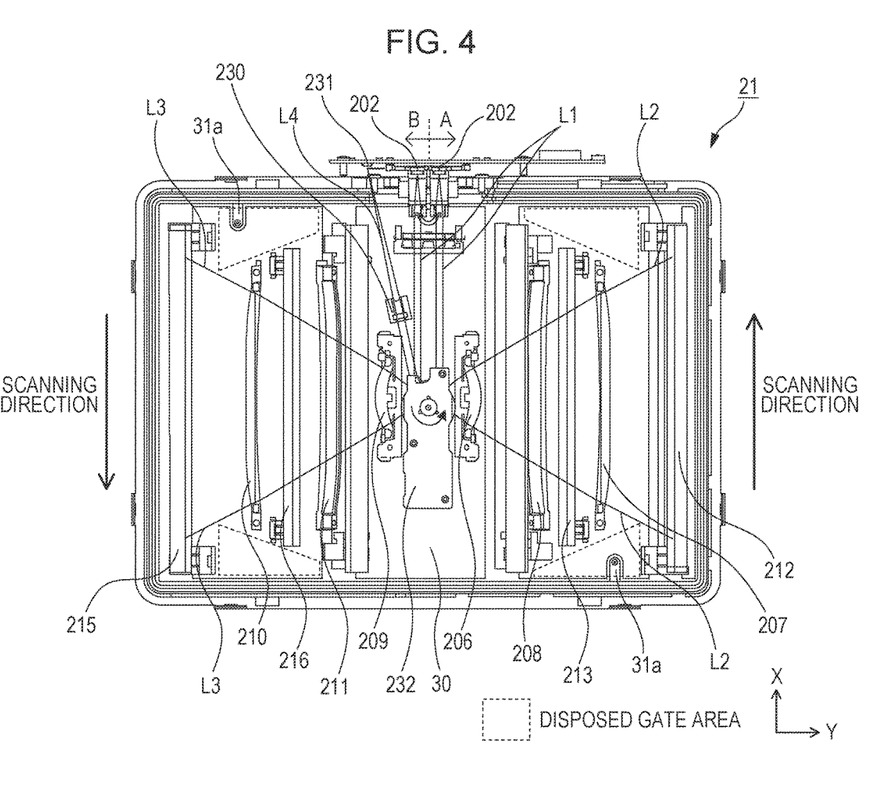
FIG. 4 is an explanatory view of a disposed gate area in the first embodiment.

In view of this, the gates 31a are disposed such that there is no problem with the light paths for the light beams and so on even when the runner portions 31c greatly protrude in the optical scanning device 21 in the embodiment, and the areas at which the gates 31a are disposed will be described with reference to FIG. 4. FIG. 4 is a diagram of the optical scanning device 21 in the embodiment when viewed from the lower side (−Z-axis direction) and shows, for example, the cover 30 and the optical components (such as the lenses and the reflection mirrors), other than the optical housing 20, that are disposed in the interior of the optical scanning device 21.

In FIG. 4, each of the light beams emitted from the light source units 202 (Y, M, C, and Bk) propagates along one of incident light paths L1 and is incident on the rotating polygon mirror (not shown in FIG. 4) driven by a polygon motor 232. In FIG. 4, the light source units 202 that are disposed on the A side are the light source units 202Y and 202M described above. The light source units 202 that are disposed on the B side are the light source units 202C and 202Bk described above. Each of the light beams incident on the rotating polygon mirror that rotates in the direction of an arrow (counterclockwise direction) is deflected to the reflection mirror 212 or 215 along one of scanning light paths L2 or scanning light paths L3. In the figure, the scanning direction represents a direction in which each of the light beams deflected by the rotating polygon mirror is scanned. The light beams emitted from the light source units 202Y and 202M are deflected to the A side in the figure (right hand direction in the figure). The scanning light paths L2 represent scanning light paths through which the light beam emitted from the light source unit 202Y propagates to the reflection mirror 212. The light beams emitted from the light source units 202C and 202Bk are deflected to the B side in the figure (left hand direction in the figure). The scanning light paths L3 represent scanning light paths through which the light beam emitted from the light source unit 202Bk propagates to the reflection mirror 215. The scanning light paths L2 represent light paths for the light beam propagating toward the reflection mirror 212 when the scanning is started and when the scanning is finished. The scanning light paths L3 likewise represent light paths for the light beam propagating toward the reflection mirror 215 when the scanning is started and when the scanning is finished. In the optical scanning device 21, the light beams emitted from the light source units 202 are deflected by the rotating polygon mirror (not shown in FIG. 4) and are incident on a synchronizing sensor 231 along synchronizing light paths L4 via an anamorphic lens 230. The synchronizing sensor 231 makes, on the basis of timing of the incident light beams, synchronous signals that indicate scan-start timing with which the light beams are emitted from the light source units 202. The other symbols in FIG. 4 have been described in FIG. 2, and the description is accordingly omitted here.

As shown in FIG. 4, the optical components (such as the lenses 206 to 211 and the reflection mirrors 212, 213, 215, and 216), mechanical components that secure the lenses and mirrors, and so on are disposed in the interior of the optical scanning device 21. Electrical components such as the polygon motor 232, the synchronizing sensor 231, and so on are also disposed in the interior of the optical scanning device 21. There are the incident light paths L1, the scanning light paths L2 and L3, and the synchronizing light paths L4, through which the light beams propagate, in spaces in the optical scanning device 21. In FIG. 4, the light paths L1 to L4 are each shown by two solid lines, and the light beams propagate within light path areas that are the spaces occupied between the two solid lines. The light path areas occupied by the scanning light paths L2, L3 are largest in the optical scanning device 21. In FIG. 4, there are areas, surrounded by dashed lines, in which there is no component or light path. These areas are referred to as "disposed gate areas". In the disposed gate areas, the gates 31a are formed at positions at which a virtual normal extending vertically with respect to the cover 30 from each gate 31a does not intersect the light path areas of the light beams in the optical housing 20. Accordingly, when the gates 31a are provided in the disposed gate areas, the light paths are not blocked by the runner portions 31c formed at the gates 31a, and the posture of the components is not changed due to the contact with the runner portions 31c. In the embodiment, the disposed gate areas are provided at four positions, and the gates 31a for the seal member 31 are disposed at two positions of these positions. Accordingly, the protruding runner portions 31c at the gates 31a do not affect the exposure performance of the optical scanning device 21.

In the optical scanning device 21, as shown in FIG. 4, the reflection mirrors (for example, the reflection mirrors 212, 215) and the scanning lenses (for example, the lenses 207, 210) are disposed in parallel with the scanning direction of a scan optical system (X-axis direction). In many cases, the reflection mirrors and the scanning lenses are disposed near the outer periphery (short sides in the figure) of the optical housing 20 that is parallel with the scanning direction (X-axis direction) in order to effectively use the spaces in the optical housing. Accordingly, the gates are preferably disposed at positions other than the sides of the optical scanning device 21 that are parallel with the scanning direction (X-axis direction), i.e., positions on the outer peripheral sides (long sides) that are sides in the direction (Y-axis direction) perpendicular to the scanning direction.

Providing the seal member 31 integrally on the cover 30 by injection molding, as described above, enables the process of attaching a separated seal member to the cover to be eliminated and the additional work process of cutting the runner portions 31c of the seal member 31 to also be eliminated. Consequently, the process of making the cover including the seal member can be simplified and the cost of the components can be reduced. In addition, the effect of the molding is to make the shape of the seal member 31 uniform, and hence good sealability can be stably ensured.

Because the hot melt adhesive hardens relatively quickly after being injected, it is desirable that, when a plurality of the gates 31a are provided, the gates be disposed such that the entire flow path is substantially equally divided. It is of course necessary to dispose the gates 31a at the disposed gate areas, in which there is no light path or component. According to the embodiment, the seal member can be injection-molded with a simple structure that needs no complicated assembling process, as described above.

Second Embodiment

In the optical scanning device, the rotation of the polygon motor creates a negative pressure in the interior of the apparatus, and it may be easy for the optical scanning device to draw air from the exterior into the interior. For this reason, there is an optical scanning device in which the polygon motor is placed on a portion of the optical scanning device that is in an independent space divided by, for example, a partition. In this embodiment, the disposed gate area of the cover, when the space in which the polygon motor is disposed is sealed by the cover that is sealed by the seal member, will be described.

[Structure of Image Forming Apparatus]

Figure 5:
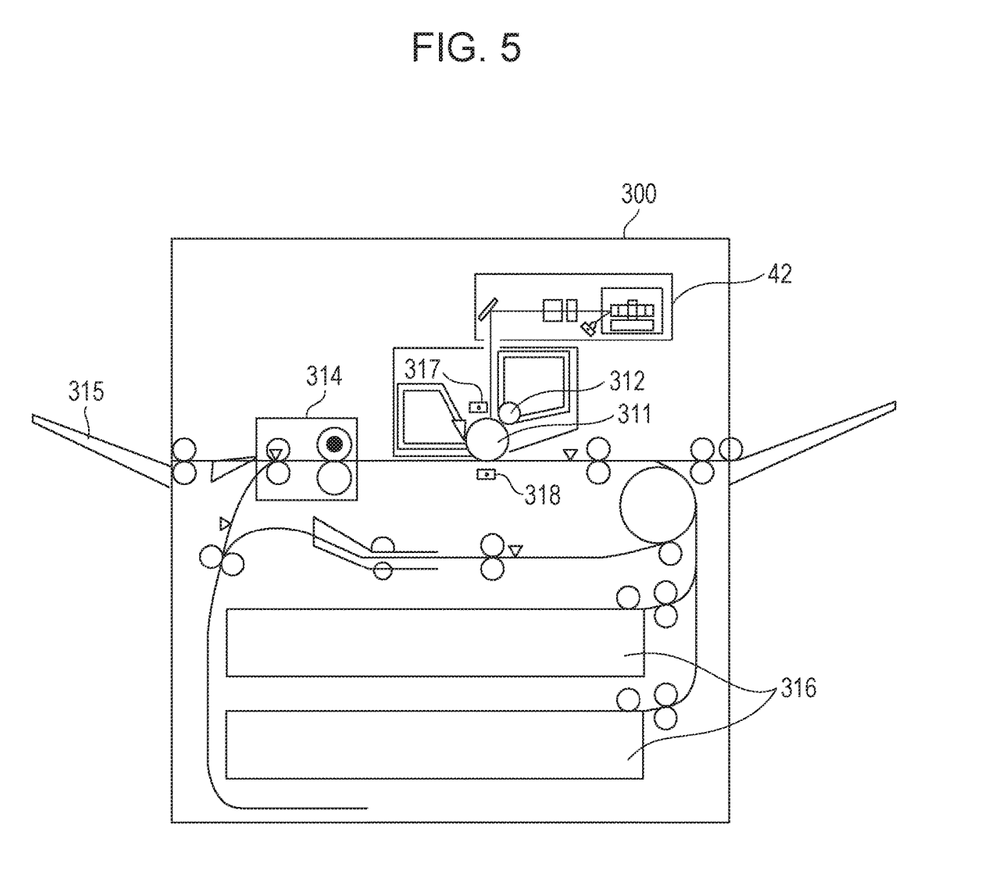
FIG. 5 is a sectional schematic view of an image forming apparatus in the second embodiment.

A laser beam printer will be described as an example of an electrophotographic image forming apparatus in a second embodiment. FIG. 5 shows the schematic structure of a laser beam printer 300. The laser beam printer 300 is a monochrome image forming apparatus including one photosensitive drum. The laser beam printer 300 includes a photosensitive drum 311 on which an electrostatic latent image is formed by an optical scanning device 42, a charging device 317 that uniformly charges the photosensitive drum 311, and a developing device 312 that develops the electrostatic latent image formed on the photosensitive drum 311 with toner. A toner image developed on the photosensitive drum 311 is transferred to recording paper supplied from a cassette 316 with a transfer unit 318. The toner image transferred to the recording paper is fixed with a fixing device 314 and the recording paper is then discharged to a tray 315. The photosensitive drum 311, the charging device 317, the developing device 312, and the transfer unit 318 constitute an image forming unit. The laser beam printer 300 also includes a controller, not shown, that controls the action of forming an image by the image forming unit and the action of feeding recording paper.

[Outline of Optical Scanning Device]

Figure 6:
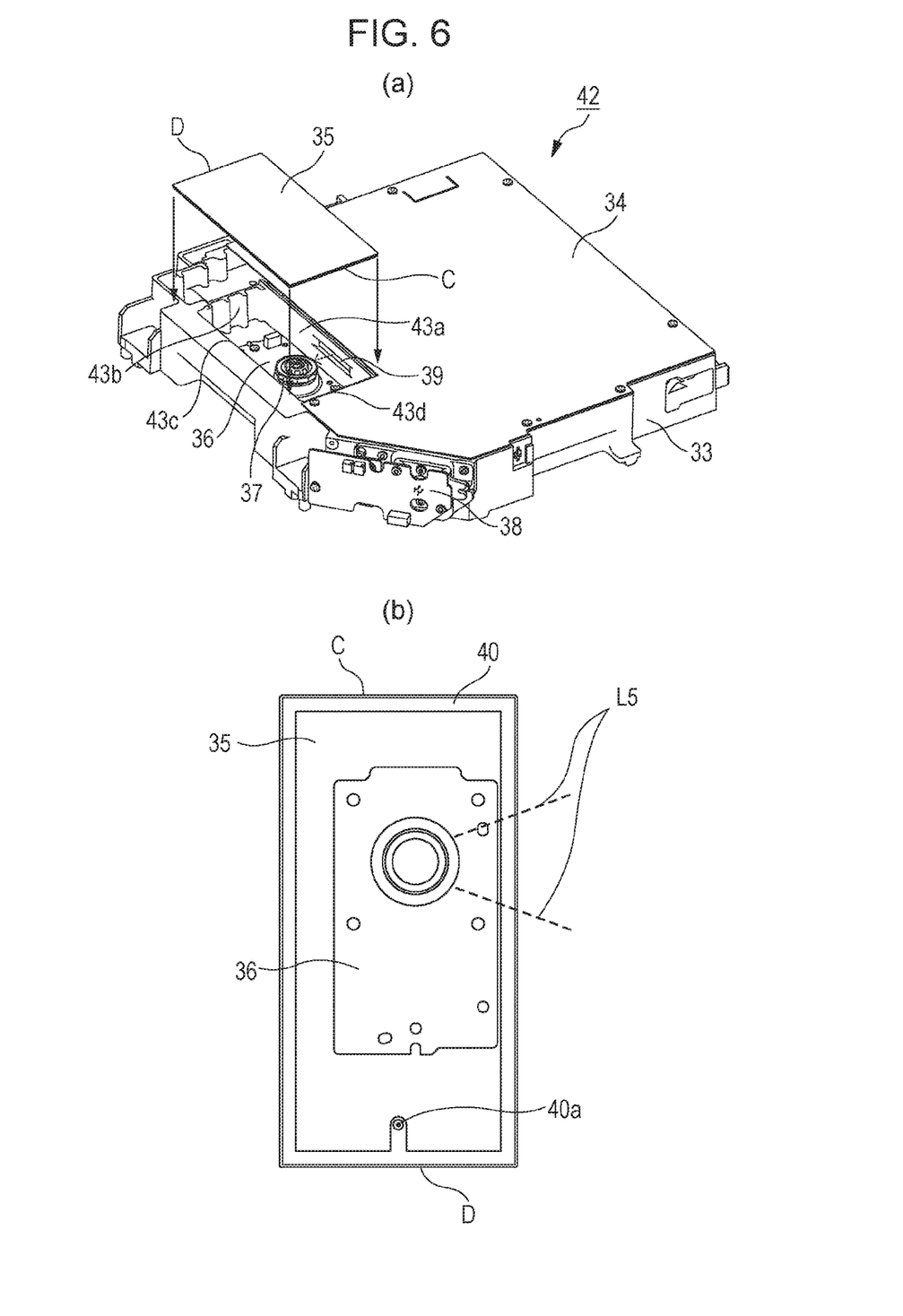
FIG. 6 shows a perspective view of the structure of the optical scanning device in the second embodiment and an explanatory view of the structure of a cover and a gate of the optical scanning device.

FIG. 6(a) is a perspective view showing the appearance of the optical scanning device 42 in this embodiment. An optical housing 33 includes a first opening that is an opened side and defined by partition walls 43a, 43b, 43c, and 43d described later, and a second opening that is the opened side of the optical housing other than the first opening. The optical housing 33 is sealed such that the first opening is sealed by a cover 34 that is a second cover and the second opening is sealed by a cover 35 that is a first cover. In the figure, the upper portion of the cover 35 is represented by C, and the lower portion of the cover 35 is represented by D. A space sealed by the cover 35 is surrounded by the partition walls 43a, 43b, 43c, and 43d molded integrally with the optical housing 33 in the optical scanning device 42. The partition walls 43a, 43b, 43c, and 43d are provided so as to extend vertically from the bottom surface of the optical housing 33. The adjacent partition walls are connected. The partition wall 43a is provided with an opening portion 39 through which a light beam passes. A polygon motor 36 and a rotating polygon mirror 37 that is rotated by the polygon motor 36 are placed on the bottom surface of the optical housing 33 surrounded by the partition walls 43a, 43b, 43c, and 43d. A light beam emitted from a light source unit 38 is reflected by a reflection mirror, not shown, that is provided in the interior of the optical scanning device 42 sealed by the cover 34, and the light beam is then incident on the rotating polygon mirror 37 via the opening portion 39 (shown by a dashed arrow in the figure). The light beam incident on the rotating polygon mirror 37 is deflected and again incident on the side sealed by the cover 34 via the opening portion 39.

In this embodiment, as shown in FIG. 6(a), the cover 35, which covers only the opened side above the independent space in which the polygon motor 36 is placed on the bottom, is provided. FIG. 6(b) is a diagram of the cover 35 when viewed from the side of the polygon motor 36 (bottom surface side of the optical scanning device 42). The external shape of the polygon motor 36 is overlapped so that positional relations with a seal member 40 molded at the outer periphery of the cover 35 can be seen. Scanning light paths L5 (shown by dashed lines) represent light paths through which the light beam incident on the rotating polygon mirror 37 is reflected and the deflected light beam (reflected light) propagates. The light beam propagates within a light path area that is a space occupied between the two dashed lines. The cover 35 includes the seal member 40, a gate 40a, and a channel through which hot melt injected from the gate 40a flows. The seal member 40 is a dustproof member that is sandwiched between the cover 35 and the vertically extending partition walls 43a, 43b, 43c, and 43d and molded on the cover 35 in order to protect the interior of the optical housing from dust. The gate 40a is used to inject the hot melt to form the seal member 40. When the cover 35 is attached to the optical housing 33, the injected hot melt is caused to flow through the channel and the seal member 40 is thereby formed so as to be sandwiched between the partition walls 43a, 43b, 43c, and 43d and the cover 35. The seal member 40 is consequently injection-molded along the periphery of the cover 35 over the entire circumference. The gate 40a is provided for this molding.

In this embodiment, the gate 40a is formed at a position at which a virtual normal extending vertically with respect to the cover 35 from the gate 40a does not intersect the light path area for the light beam that is surrounded by the partition walls 43a to 43d in the optical housing 33, as in the first embodiment. Accordingly, the gate 40a is provided at a position away from the polygon motor 36 and the scanning light paths L5 in this embodiment. However, a plurality of the gates 40a may be provided. The same effects as the first embodiment can be consequently achieved in this embodiment. Specifically, providing the seal member 40 integrally on the cover 35 by injection molding enables the process of attaching a separated seal member to the cover to be eliminated and the process of cutting the runner portion of the seal member 40 to also be eliminated. Consequently, the process of making the cover including the seal member can be simplified and the cost of the components can be reduced. In addition, the effect of the molding is to make the shape of the seal member 40 uniform, and hence good sealability can be ensured. With regard to the cover 34, the same effects as the first embodiment can be achieved, when the gate is provided at a position apart from the optical components disposed in the interior of the optical housing 33 covered by the cover 34, the incident light path, the scanning light path, and the synchronizing light path, through which the light beam propagates, as in the first embodiment. According to this embodiment, the seal member can be injection-molded with a simple structure that needs no complicated assembling process, as described above.

The present invention is not limited to the above embodiment, and various variations and modifications are available without departing from the concept and scope of the present invention. Accordingly, the following claims are attached to publish the scope of the present invention.

This application claims the benefit of Japanese Patent Application No. 2013-212157, filed Oct. 9, 2013, which is hereby incorporated by reference herein in its entirety.

REFERENCE SIGNS LIST 20 optical housing
30 cover
31 seal member
31a gate
202 light source unit
203 rotating polygon mirror

The invention claimed is:

1. An optical scanning device comprising:
a light source configured to emit a light beam;
a rotating polygon mirror configured to deflect the light beam such that the light beam emitted from the light source is scanned on a photosensitive member;
a lens and a reflection mirror configured to direct the light beam deflected by the rotating polygon mirror onto the photosensitive member;
an optical housing that contains the rotating polygon mirror and the optical component; and
a cover attached to the optical housing to cover an opening of the optical housing,
wherein the cover includes
a sealing member molded on the cover, and sandwiched between the cover and a side wall of the optical housing, for sealing a space between the cover and the side wall, and
a channel through which the sealing member, being melted and injected in the molding process, flows, the channel being formed in the cover such that the sealing member which has been fixed is sandwiched between the side wall and the cover by attaching the cover to the optical housing,
wherein the channel includes a first channel portion for holding a portion of the sealing member sandwiched between the side wall and the cover and a second channel portion connected with the first channel portion and extending from a part of the first channel portion toward an area surrounded by the first channel portion, the second channel potion is provided outside a light path area for the light beam when viewed in a direction of a rotational axis of the rotating polygon mirror, and the second channel portion is used as an inlet through which the sealing member being melted is injected into the channel.

2. The optical scanning device according to claim 1, further comprising:
a sensor that generates a synchronous signal by receiving the light beam deflected by the rotating polygon mirror,
wherein the light path area for the light beam is an area occupied by an incident light path of the light beam emitted from the light source and being incident on the rotating polygon mirror, a scanning light path of the light beam deflected by the rotating polygon mirror and directed onto the photosensitive member, and a synchronizing light path of the light beam deflected by the rotating polygon mirror and being incident on the sensor.

3. The optical scanning device according to claim 1, wherein lens and reflection mirror are not disposed on a bottom of the optical housing that faces the second channel portion of the cover.

4. The optical scanning device according to claim 1, wherein the lens and reflection mirror are not disposed on a bottom of the optical housing that faces the second channel portion of the cover.

5. The optical scanning device according to claim 1, wherein the lens and the reflection mirror are arranged in parallel with a scanning direction of the light beam deflected by the rotating polygon mirror.

6. The optical scanning device according to claim 1, wherein the light path area for the light beam is an area occupied by an incident light path of the light beam emitted from the light source and being incident on the rotating polygon mirror.

7. The optical scanning device according to claim 1, wherein the light path area for the light beam is an area occupied by a scanning light path of the light beam deflected by the rotating polygon mirror and directed on the photosensitive member.

8. The optical scanning device according to claim 1, further comprising;
a sensor that generates a synchronous signal by receiving the light beam deflected by the rotating polygon mirror,
wherein the light path area for the light beam is an area occupied by a synchronizing light path of the light beam deflected by the rotating polygon mirror and being incident on the sensor.

9. The optical scanning device according to claim 1, wherein the side wall is erected from a bottom of the optical housing by surrounding the rotating polygon mirror and the lens and the reflection mirror, and wherein the sealing member has been fixed on the cover by facing to the side wall surrounding entirely around the rotating polygon mirror and the lens and the reflection mirror.

10. The optical scanning device according to claim 1, wherein the cover is provided with a transparent dustproof window that allows the light beam deflected by the rotating polygon mirror.

* * * * *